United States Patent
Heidtmann et al.

(10) Patent No.: US 10,836,491 B2
(45) Date of Patent: Nov. 17, 2020

(54) PARTITION WALL MODULE FOR A CABIN OF A VEHICLE FOR AN OPTICAL AND MECHANICAL SEPARATION OF DIFFERENT CABIN REGIONS

(71) Applicant: Airbus Operations GmbH, Hamburg (DE)

(72) Inventors: Andreas Heidtmann, Hamburg (DE); Jörg Weifenbach, Hamburg (DE); Mark Herzog, Hamburg (DE); Roland Lange, Nottensdorf (DE)

(73) Assignee: Airbus Operations GmbH (DE)

( * ) Notice: Subject to any disclaimer, the term of this patent is extended or adjusted under 35 U.S.C. 154(b) by 414 days.

(21) Appl. No.: 15/459,796

(22) Filed: Mar. 15, 2017

(65) Prior Publication Data

US 2017/0267350 A1   Sep. 21, 2017

(30) Foreign Application Priority Data

Mar. 15, 2016   (DE) .......................... 10 2016 104 794

(51) Int. Cl.
*B64D 11/00* (2006.01)
*B60R 21/02* (2006.01)

(52) U.S. Cl.
CPC ........ *B64D 11/0023* (2013.01); *B60R 21/026* (2013.01); *B64D 11/003* (2013.01)

(58) Field of Classification Search
CPC ............ B64D 11/0023; B60R 13/0823; B60R 21/026

See application file for complete search history.

(56) References Cited

U.S. PATENT DOCUMENTS 4,621,856 A  *  11/1986  McKenzie  ............ B60R 21/026
                                                 280/749
5,024,398 A  *   6/1991  Riedinger  .......... B64D 11/0015
                                                 244/118.5

(Continued)

FOREIGN PATENT DOCUMENTS

DE          44 37 133 C2     8/1996
DE       102012021430 A1     4/2014

(Continued)

OTHER PUBLICATIONS

German Patent Office, German Search Report for German Patent Application No. 10 2016 104 794.5 dated Dec. 21, 2016.

*Primary Examiner* — Joseph W Sanderson
(74) *Attorney, Agent, or Firm* — Lerner, David, Littenberg, Krumholz & Mentlik, LLP

(57) ABSTRACT

A wall module for a cabin of a vehicle for separation of different cabin regions comprises a lower wall section having a fastener for fastening the wall module to a structurally fixed component fixed to the floor in the cabin, a surface-like rigid upper wall section converging with the lower wall section having a second fastener in a region of the wall module facing away from the lower wall section for fastening the wall module to a structurally fixed component fixed to the ceiling in the cabin. The upper wall section at least in a region comprises an arched curvature around a horizontal axis for adapting to the shape of a backrest of a seat. The wall module comprises at least one element stiffer than the upper wall section, which extends from a region adjacent the floor to a region adjacent the ceiling of the wall module.

12 Claims, 3 Drawing Sheets

(56) References Cited

U.S. PATENT DOCUMENTS

| | | | | |
|---|---|---|---|---|
| 5,246,261 A | * | 9/1993 | McCormack | B60R 21/026 296/24.34 |
| 5,482,230 A | * | 1/1996 | Bird | B64C 1/10 244/118.5 |
| 5,577,358 A | * | 11/1996 | Franke | B64D 11/0023 244/118.5 |
| 5,735,564 A | * | 4/1998 | Coogan | B60R 21/026 280/748 |
| 6,669,259 B2 | * | 12/2003 | Murray | B60R 7/14 296/24.46 |
| 8,167,244 B2 | * | 5/2012 | Johnson | B64D 11/0023 105/344 |
| 8,286,917 B2 | * | 10/2012 | Erickson | B64D 11/0023 244/131 |
| 8,672,267 B2 | * | 3/2014 | Schliwa | B64D 11/02 244/118.6 |
| 9,045,231 B2 | * | 6/2015 | Swain | B64D 11/0023 |
| 9,550,572 B2 | * | 1/2017 | Jacobsen | B64D 11/0023 |
| 9,738,385 B2 | * | 8/2017 | Mayer | B64D 11/0693 |
| 9,862,164 B2 | * | 1/2018 | Gray | B32B 3/18 |
| 10,232,942 B2 | * | 3/2019 | McKee | B64D 11/003 |
| 2003/0090118 A1 | * | 5/2003 | Murray | B60R 7/14 296/24.4 |
| 2006/0032155 A1 | * | 2/2006 | Thomassin | B64D 11/0023 52/36.2 |
| 2009/0200422 A1 | | 8/2009 | Johnson et al. | |
| 2009/0321574 A1 | * | 12/2009 | Erickson | B64D 11/0023 244/131 |
| 2012/0025018 A1 | | 2/2012 | France et al. | |
| 2013/0001359 A1 | * | 1/2013 | Schliwa | B64D 11/02 244/118.6 |
| 2014/0124624 A1 | * | 5/2014 | Jacobsen | B64D 11/0023 244/118.5 |
| 2015/0284082 A1 | | 10/2015 | Mayer et al. | |
| 2016/0304204 A1 | * | 10/2016 | McKee | B64D 11/003 |
| 2016/0332412 A1 | * | 11/2016 | Gray | B32B 3/18 |
| 2017/0253190 A1 | * | 9/2017 | Hodges | B60N 3/06 |
| 2017/0283060 A1 | * | 10/2017 | Papke | B64D 11/0023 |
| 2019/0126852 A1 | * | 5/2019 | Hupperich | B60R 13/00 |

FOREIGN PATENT DOCUMENTS

| | | | | |
|---|---|---|---|---|
| WO | | 9301088 A1 | 1/1993 | |
| WO | WO-2009151362 A1 | * | 12/2009 | ......... B60R 21/026 |
| WO | | 2016168441 A1 | 10/2016 | |

* cited by examiner

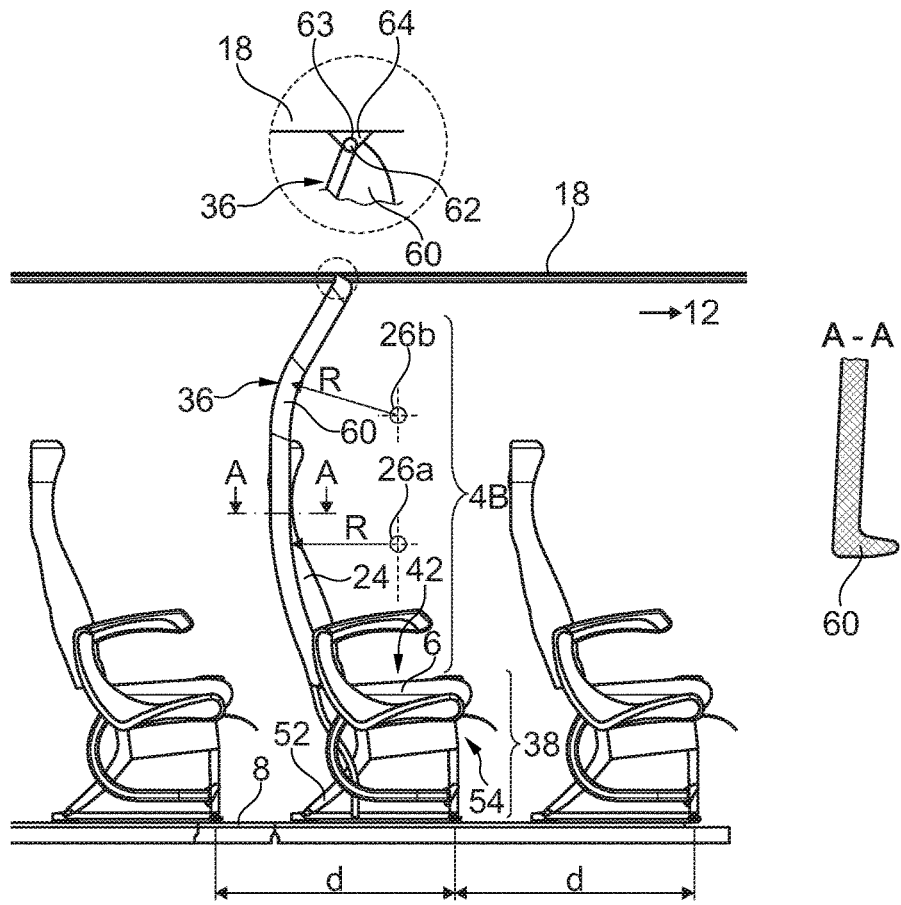
Fig. 2a
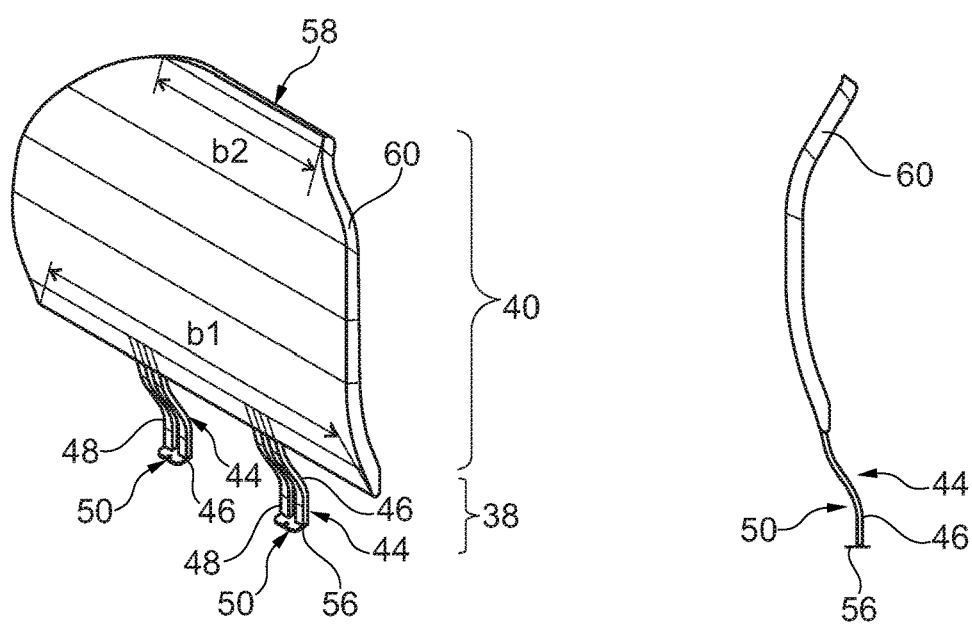
Fig. 2b
Fig. 2c

PARTITION WALL MODULE FOR A CABIN OF A VEHICLE FOR AN OPTICAL AND MECHANICAL SEPARATION OF DIFFERENT CABIN REGIONS

CROSS-REFERENCE TO RELATED FOREIGN APPLICATION

This application claims the benefit of, and priority to, German patent application number 10 2016 104 794.5, filed on Mar. 15, 2016.

TECHNICAL FIELD

Embodiments of the invention relate to a partition wall module for a cabin of a vehicle for an optical and mechanical separation of different cabin regions as well as a vehicle having a cabin created therein, which is equipped with at least one such partition wall module.

BACKGROUND

The configuration of passenger cabins of vehicles for the transport of passengers, e.g., a commercial aircraft, is subject to the requirement of a particularly high space efficiency, low manufacturing costs and a sufficient modularity and adaptability to individual design requirements of a vehicle operator, respectively, with a low number of different components at the same time. In particular, the space efficiency may be increased by enabling multiple uses of components and space regions. A purpose of the high space efficiency to be particularly emphasized lies in maximizing the number of accommodatable passenger seats in the respective cabin without limiting the comfort of passengers. For this purpose, cabin monuments are often improved in their composition, such that as many functions as possible are made available on a space as small as possible.

Furthermore, an at least optical separation of different cabin regions, that adjoin each other, is often desired, e.g., between a door region and a passenger seat region or between two passenger seat regions with a different class layout. For this purpose, particularly partition walls are used, which are fixedly arranged in the cabin.

For example, German patent document DE 44 37 133 C2 shows a partition wall for a cabin of an aircraft for an optical separation of different cabin regions, wherein the partition wall consists of a lower partial wall and an upper partial wall, which are fixedly connected to each other in an overlapping region. The horizontally extending offset in each case is arranged in the centre of the vertical extension of the respective partial wall.

BRIEF SUMMARY

In relatively highly compacted passenger cabins, the available space in front of a cabin monument, e.g., with a toilet arranged therein, may be less than in common layouts due to an extension of seating capacities. As a result, the situation may arise that the travel comfort of passengers on a seat row arranged in front of the cabin monument is impaired, because users of the respective cabin monument may repeatedly bump against the seats of this seat row.

An object of the disclosed subject matter lies in designing a separation of a relatively highly compacted cabin of a transportation means in such a manner that, despite a high compacting and low installation space between a cabin monument and a passenger seat, the comfort of a passenger on the passenger seat is improved.

The object can be met by an exemplary embodiment of a partition wall having the features of claim 1. Advantageous embodiments and further improvements can be gathered from the sub-claims and the following description.

It is proposed a partition wall module for a cabin of a vehicle for an optical and mechanical separation of different cabin regions, the partition wall module comprising a lower partition wall section having at least one first fastening means for fastening the partition wall module to at least one near-floor structurally fixed component in the cabin and a surface-like rigid upper partition wall section converging with the lower partition wall section and having at least one second fastening means in a region of the partition wall module facing away from the lower partition wall section for fastening the partition wall module to at least one near-ceiling structurally fixed component in the cabin. The upper partition wall section at least in a region comprises an arched curvature around a horizontal axis for adapting to the shape of a backrest of a passenger seat.

Consequently, a partition wall module is proposed, which is mountable directly behind a backrest of a passenger seat in a passenger cabin of a vehicle and thereby extends from a floor of the cabin up to a ceiling region. In doing so, an effective optical separation of two cabin regions is conducted, without taking up very much installation space for this purpose and to react completely flexibly to requirements that change on the part of the vehicle operator. Practically, a separation of two cabin regions for one mission of the vehicle or for a limited time may be achieved, because the partition wall module would not require any adjustments to the cabin layout.

The arched curvature of the upper partition wall section manifests itself through a curvature around at least one axis of curvature, which is substantially horizontal to the cabin floor, wherein the curvature is adapted to the shaping of the passenger seat in the cabin. Since often the selection and installation of passenger seats and other furnishing items is at the vehicle operator's responsibility, the partition wall module according to the invention may be designed differently for vehicles of different vehicle operators. However, passenger seats generally comprise a slight, ergonomical C-shaped forward curvature of the backrest. It is furthermore to be indicated that the arched curvature does not necessarily comprises only a single radius of curvature around a single axis of curvature. Rather, the arched shaped curvature may also be a sequence of a plurality of differently curved sections, which each comprise a constant curvature or a certain curvature progression, wherein the respective sections evenly or harmonically, respectively, merge into each other by means of a certain transition region or may join each other discontinuously, i.e., under creation of steps or kinks. Furthermore, it is not to be ruled out that the partition wall may additionally comprise a slight curvature around an axis that is vertical to the cabin floor.

Through using the upper, rigid, surface-like partition wall section, which is at least in part archedly curved and therefore arrangeable directly behind a backrest of a passenger seat and as a fastening of the partition wall module is conducted both floor-near as well as in a ceiling region, the passenger seat that directly borders is is well protected against bumps. Consequently, the space directly behind the passenger seat may be efficiently used without particular limitations for the intended tasks. For example, the respective passenger seat, which is protected by the partition wall module according to the invention, may be located in the near of or in front of a toilet, which is confronted with a high passenger traffic at least at times. Passengers, which pass the respective passenger seat on the way from or to the toilet, may inadvertently bump against the partition wall module attached directly behind the passenger seat at a maximum, and the passenger that rests on the passenger seat is not disturbed. Hence, the partition wall module creates a capsule or hull for the passenger seat, respectively.

In general, the partition wall module should comprise a width that is adapted to the passenger seat(s) depending on intended installation place. In case, e.g., groups of passenger seats having two or three adjacent seats each are located in the vehicle, the partition wall module should be adapted to the width of this group of passenger seats. Both a corner of a passenger seat that faces to an aisle is consequently protected and it may be prevented that a lateral edge of the partition wall module reaches into a neighboring aisle. The width of the partition wall module refers to the clear distance of the outer edges of the partition wall module.

The arrangement of the partition wall module at structurally fixed near-floor and near-ceiling components may be realized in different ways, depending on the equipment and layout of the cabin. Besides the use of already available systems in the cabin for fastening of passenger seats, over-head service units and other devices, also dedicated holding points may be used. Near-ceiling components also do not need to be ceiling lining elements or structural parts carrying these, but may also be components arranged thereon, which are located near the ceiling, e.g., over-head stowage bins, devices arranged thereon or structural components carrying these.

Preferably, the partition wall module comprises an edge stiffening element, which extends between a near-floor region and a near-ceiling region of the partition wall module. The combination of upper and lower partition wall section is equipped with an edge stiffening element, which provides a higher stiffness to the surface-like structure of the partition wall module, which as a tendency has a lower stiffness compared to partially bent, protrusion comprising or folded parts, such that a bending in the direction of the curvature is counteracted. A major part of the perimeter along a substantial extension of the partition wall module may consequently be equipped with an edge stiffening element at the sides, while in addition thereto also intermediate stiffening elements are not excluded. The stiffening elements may also be placed next to a perimeter of the passenger seat through their rim-side arrangement and may partially overlap with the passenger seat in a longitudinal direction, i.e., along a seat and viewing direction. The edge stiffening element extends as rim-side protrusion in the direction of the curvature, i.e., in a longitudinal and viewing direction, respectively, of a passenger on the passenger seat.

In an advantageous embodiment, the partition wall module is realized as one piece and the lower partition wall section constitutes an integral part of the partition wall module. It may be manufactured from a material suitable for the vehicle and the intended purpose, which material includes metallic materials and plastic materials and in particular compound materials. While particularly compound materials having a low density and an associated low weight should be utilized for the installation in an aircraft, the use of metals and in particular aluminum is conceivable for earthbound vehicles and watercrafts. The integral manu-facturing for achieving a one-piece component, the produc-ing of a compound material laminate by layer-wise appli-cation of material layers may be included, while with metal components a shape forming process through rolling, com-pressing, drawing and the such is possible.

For simplifying the manufacturing a plate-shaped work-piece from a plastic material and particularly of a compound material may be pressed into the desired shape through a shape forming process under action of a pressure and an elevated temperature, e.g., through the so-called thermo-forming. In doing so, excellent material properties are achieved, exemplarily through adaption of fibre courses as well as through creation of complex transitions with suffi-cient roundings and associated reduced shearing forces.

In an exemplary embodiment, the first fastening means are designed to be fastened on mounting rails in a cabin floor. Rails of this sort are known in transportation means for the transport of a larger number of passengers and usually run parallel to a longitudinal axis of the cabin in a floor. Passenger seats and other furnishing items are then usually mounted onto parallelly extending floor rails by means of suitable fittings. The partition wall module according to the invention may resultantly comprise at least two first fasten-ing means, which may engage with a floor rail through a suitable fitting. For achieving an as simple displaceability as possible of the partition wall module, the utilized fittings may be operable without tools.

In an equally advantageous embodiment, at least one fastening element arranged at the ceiling of the cabin is present, which is connectable to the second fastening means. The fastening means may be arranged at an element of a ceiling lining or at a fastening element that holds an element of a ceiling lining, which fastening element is completely placed on a side of the ceiling lining facing away from the cabin floor or that at least partially extends to the cabin floor particularly directly adjacent to an element of the ceiling lining. The fastening element may be an eye, a borehole, a flange or another receiving means, which allows a simple fastening of a second fastening means.

The fastening at near-floor fastening elements may include the fastening at dedicated holding points, which are integrated into a floor of the cabin. Such an embodiment exemplarily presents itself at a rear end of a passenger seat region, at which a future extension of passenger seat capaci-ties is not to be expected, and at which behind a last passenger seat a door region, a lavatory or the such is to be arranged, such that through creating a dedicated holding point at this place a protection of the last passenger seat is achieved.

Preferably, the lower partition wall section comprises an elongate segment corresponding to the at least one first fastening means, which elongate segment extends from the at least one first fastening means to the upper partition wall section on a straight line. The particular advantage of such a design is the capability of ensuring a shape adapted to a seat frame, which shape either runs directly behind the legs of a seat frame or that extends between the legs of a seat frame to seat rails. The foot space created between legs of a seat frame may thereby still be used without limitations.

Preferably, the elongate element may comprise a gap for leading through a leg of a seat frame of a passenger seat, such that a partition wall module may be attached to a seat rail without affecting the extension or the common type of fastening of the seat frame.

For achieving an as slim silhouette of the partition wall module as possible, the elongate element may be curved in an arched-shaped manner in an opposite direction as the upper partition wall section.

In a further embodiment, the lower partition wall section may comprise at least one compartment that horizontally extends from the lower partition wall section in the direction of the curvature, which compartment is open at one side. If the partition wall module constitutes a termination between a rear seat row, such a compartment may be used for receiving bulky baggage or other objects for which there is insufficient space in overhead stowage bins. In a simple variant, the lower partition wall section may comprise a cut-out, at which a cuboid-shaped receptacle follows, which is designed for receiving objects. The depth of this cuboid-shaped receptacle may be chosen in a way that it approximately equals the depth of a seat, such that the end of the receptacle facing away from the cut-out is placed at a location underneath the passenger seat, where otherwise commonly a baggage bar is installed. As mentioned above, the integration of the at least one receptacle may be conducted through a one-piece type of construction, wherein as an alternative equipping a partition wall module with at least one receptacle may also be providable based on one-piece partition wall module selectively.

In a further advantageous embodiment, the edge stiffening element substantially runs along the whole perimeter of the upper partition wall section. In a preferred embodiment, the edge stiffening element runs on the lateral edges and the upper edge of the partition wall module in a closed line. Hence, the edge stiffening element does not comprise interruptions, but continuously extends along the whole contour allocated for it.

The invention further relates to an arrangement in a cabin of a vehicle, comprising at least one passenger seat as well as at least one partition wall module directly arranged behind the backrest of the at least one passenger seat, the partition wall module having the above described features.

In an advantageous embodiment, the partition wall module borders a door region of the vehicle. A passenger cabin and particularly an aircraft cabin commonly comprises a plurality of doors, through which passengers and crew members may enter or exit the vehicle. A so-called door region hereby is to be considered a section within the cabin, which is simply arranged between two laterally opposed vehicle doors in the cabin or as a region, that runs from a vehicle door to one or a plurality of aisles that extend parallel to a longitudinal cabin axis. According to the invention, the door region is limited by the cabin monument at least one-sided, i.e., at a side or edge, which monument is arranged on a standing area that directly borders the door region.

It is also advantageous if the partition wall module is located between a passenger seat and an access to a cabin monument, which exemplarily houses a lavatory.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Further characteristics, advantages and potential applications of the disclosed subject matter result from the following description of the exemplary embodiments illustrated in the figures. In this respect, all described and/or graphically illustrated characteristics also form the object of the invention individually and in arbitrary combination regardless of their composition in the individual claims or their references to other claims. Furthermore, identical or similar objects are identified by the same reference symbols in the figures.

FIG. 2a shows a variant of a partition wall module in an installed state in a lateral view.

FIG. 2b shows a variant of a partition wall module in an installed state in a three-dimensional view.

FIG. 2c shows a variant of a partition wall module in an installed state in a lateral view.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
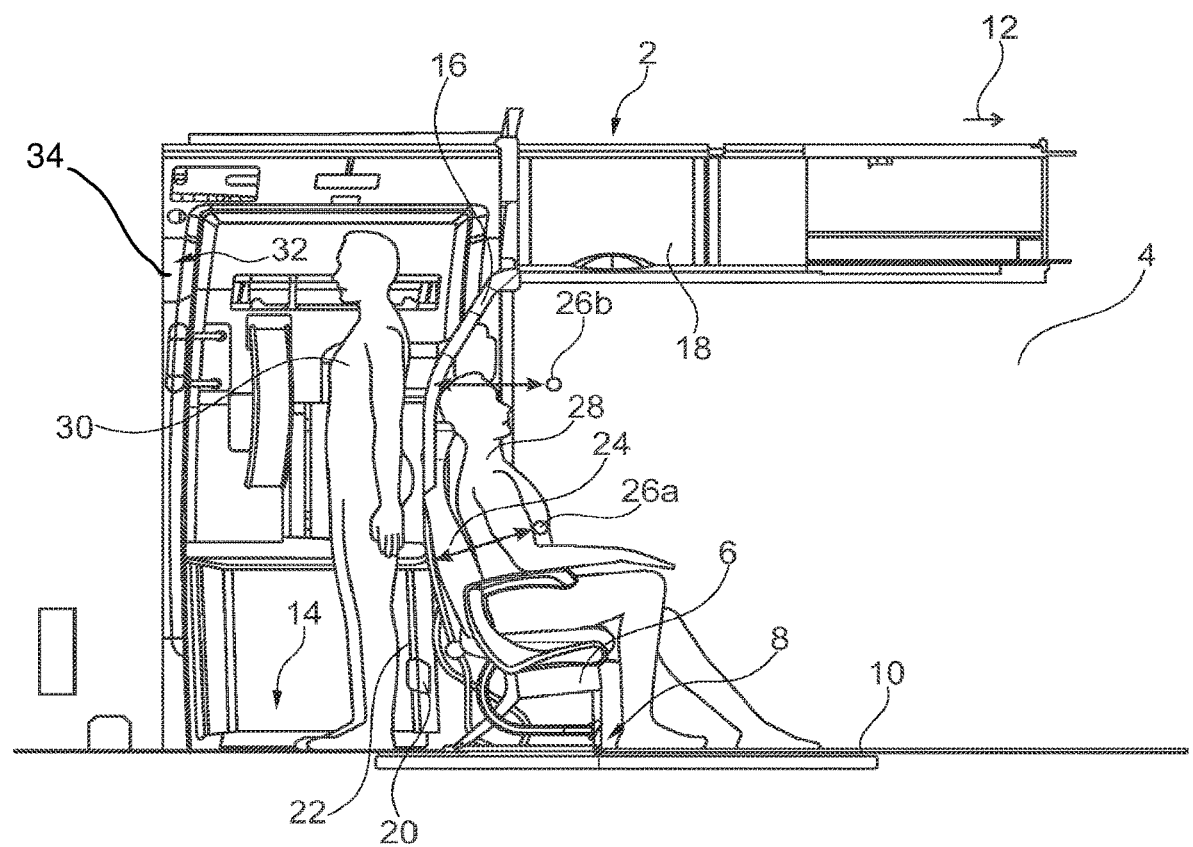
FIG. 1 shows an arrangement of a passenger seat and a partition wall module arranged behind and in front of a door region of an aircraft cabin in a lateral view.

FIG. 1 schematically shows an arrangement 2 in a cabin 4 of an aircraft having a passenger seat 6, which is fastened on mounting rails in form of floor rails 8 in a cabin floor 10 and that is placed in front of a door region 14 in a flight or longitudinal direction 12, respectively. A partition wall module 16 extends from the cabin floor 10 to a near-ceiling over-head stowage bin 18 and is both fastened to the cabin floor 10 and to an end of the over-head stowage bin 18 reaching into the door region 14. The fastening does not necessarily have to be conducted at the over-head stowage bin, but may also be conducted at a frame (not shown in detail) that holds the over-head stowage bin 18. The partition wall module 16 is a rigid, shell-like body and comprises a lower partition wall section 20 and an upper partition wall section 22, which merge into each other and comprise an arched curvature adapted to the contour of a backrest 24 of the passenger seat 6 in two curvature sections, each around a horizontal axis 26a and 26b, respectively, that follow on each other with roundings.

Altogether, the partition wall module 16 is a surface-like rigid component, which protects a passenger 28 on a passenger seat 6 of inadvertent bumps through a person 30 located behind in the door region 14. Hence, the passenger seat 6 may be moved very close into the door region 14 without further provisions, which positively influences the space efficiency in the cabin 4 and, particularly with a multiple arrangement in the cabin 4, allows the installation of one or further additional rows of passenger seats 6. The arranging of the partition wall module 16 directly at the door region 14 further allows an unhindered access to an access opening 32 of a cabin monument 34, which exemplarily houses a lavatory, without diminishing the feeling of comfort of a passenger 28 or another person 30. Detailed illustrations of the partition wall module 16 are shown further below.

For the setup of the partition wall module 16, different variants may be considered, from which a first is exemplarily chosen and shown in FIGS. 2a, 2b and 2c. For this purpose, a partition wall module 36 is shown, which comprises a lower partition wall section 38 and an upper partition wall section 40 and which extends from the floor rails 8 to an over-head stowage bin 18 directly behind the backrest 24 of a passenger seat 6. The lower partition wall section 38 extends in a vertical direction approximately up to an upper delimitation of a seating surface 42 and is realized, as particularly illustrated in FIG. 2b, in form of two distanced elongate elements 44, which are mountable in one of the floor rails 8 in each case. These elongate elements 44 in turn each comprise two parallelly running legs 46 and 48, between which a gap 50 is created. Legs 52 of a seat frame 54 of the passenger seat 6, which extends from the seating surface 42 rearwardly, i.e., against the flight and seating direction 12, respectively, are stuck through the gaps 50 in the elongate elements 44 of the partition wall module 36 that is already fastened on the floor rails 8, and are connected with the seat rail 8 subsequently. The legs 46 and 48 of the lower partition wall section 38 furthermore comprise a fastening fitting 56, which is connectable to the floor rails 8.

Due to the arched curvature of the upper partition wall section 40, the lower partition wall section 38 may be curved in an opposite direction, such that a substantially vertically standing end of the partition wall module 36 may be realized on the floor rails 8, which positively influences the transfer of forces between the floor rails 8 and the partition wall module 36. Altogether, the partition wall module 36 consequently comprises an S-shape, wherein in the demonstrated case the dimensions of the lower leg that is equal to the lower partition wall section 38, is smaller as the dimensions of the upper leg that equals the upper partition wall section 40.

The width of the upper partition wall section 40 is adapted to the width of the group of passenger seats 6 and may continuously and/or stepwisely decrease in a vertical running direction to a near-ceiling region, exemplarily up to the over-head stowage bin 18, wherein an edge of the upper partition wall section 40 facing an aisle (not shown herein) should run as flushly as possible on the corresponding edge of the respective passenger seat 6. In this way, a width in the region of a transition between the lower partition wall section 38 and the upper partition wall section 40, which is indicated with b1, is larger than the width in an upper region of the upper partition wall section 40, which is referred to as b2. However, also constant widths b1 and b2 are conceivable as well as all mixtures thereof, according to the desires of the vehicle operator and the design of the passenger seats 6.

A lateral edge 58 of the partition wall module 36 is equipped with a stiffening element 60 as particularly apparent in a partial section denoted as "A-A", which stiffening element 60 improves the stiffness in flight or seating direction 12, respectively, i.e., in the direction of the curvature. Bumping from a side facing away from the passenger seat 6 onto the partition wall module 36 therefore does not lead to noticeable bending of the partition wall element 36, such that the passenger seat remains protected from mechanical influences.

At the same time, due to the slim silhouette of the partition wall module 36, no installation space is required, which would restrict a seat pitch d between consecutive passenger seats 6, even when being arranged between the individual passenger seats 6. At the same time, a free space underneath the respective passenger seat is freely accessible due to the design of the lower partition wall section 44, such that baggage items are stowable in this place as usual.

A suitable second fastening means 62 for fastening the partition wall module 36 to a near-ceiling region, such as an over-head stowage bin 18, may be realized in form of an eye 63, at which a fitting 64 as a fastening element is fastenable, which may be a part of the over-head stowage bin 18 or may be fastenable to this.

Figure 3A:
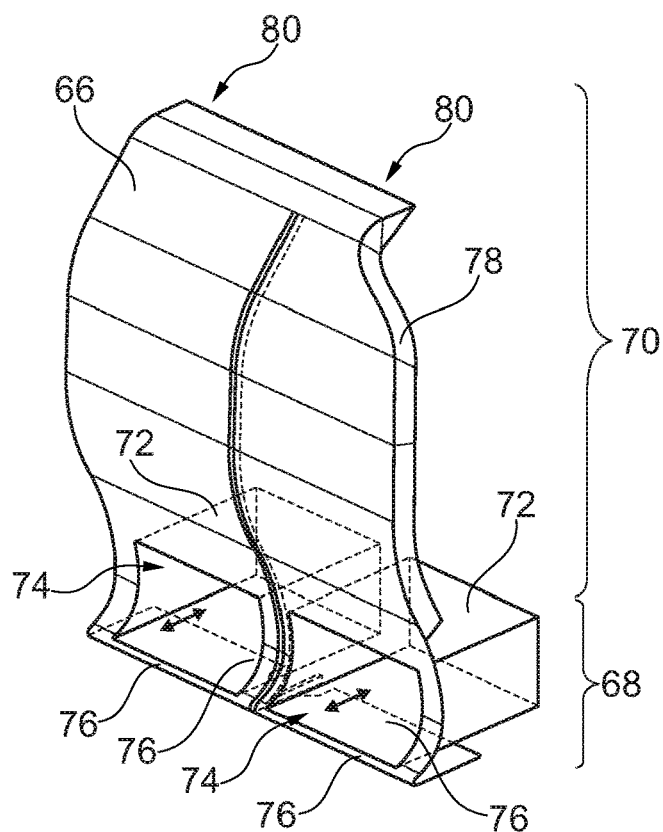
FIG. 3a shows a variant of a partition wall module in a three-dimensional view.
Figure 3B:
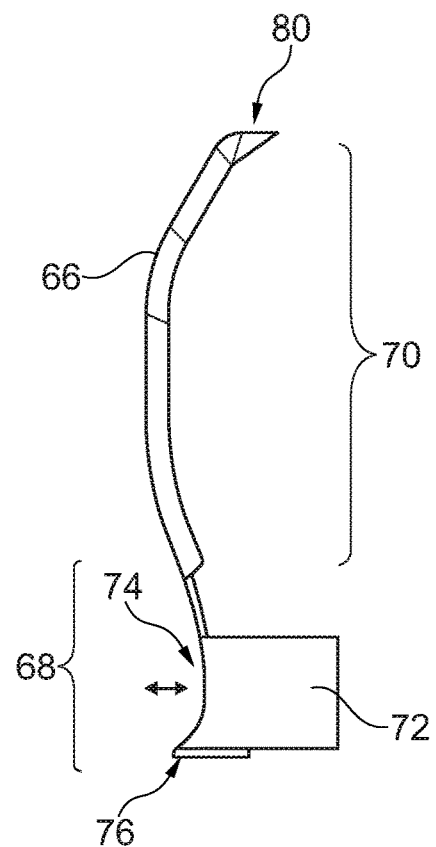
FIG. 3b shows a variant of a partition wall module in a lateral view.

This variant is particularly suitable for selectively separating a plurality of cabin sections directly within a cabin section equipped with passenger seats 6. Another variant, which may particularly present itself as a termination of a rear seating row (not shown herein), in a passenger cabin, is shown in FIGS. 3a and 3b. Here, a partition wall module 66 is illustrated, which comprises a lower partition wall section 68 and an upper partition wall section 70, which roughly have the same ratio in their vertical extension as the partition wall module 36 from FIGS. 2a to 2c. The partition wall module 66 comprises separate, cuboid-shaped receptacles 72 at the lower partition wall section as compartments, which horizontally extend in the direction of the curvature of the partition wall 6, which in each case are open one-sided and can be filled or emptied through an access opening 74. The receptacles 72 are dimensioned such that they fit underneath a seating surface 42 of a passenger seat 6 and are accessible from a back side of the partition wall module 66, but not from the passenger seat 6 arranged above. The arrangement of receptacles 72 at the partition wall module 66 may be conducted in an integral construction or by joining a plurality of components according to the above description.

First fastening means 76 may be realized in form of boreholes, openings or the such, which are either engageable with the seat rail 8 or, as an alternative, with dedicated holding points in the floor of the cabin. As also shown in the previous FIGS. 2a to 2c the partition wall module 66 may comprise stiffening elements in a rim-side arrangement, which increase the stiffness in flight direction, i.e., along the curvature of the partition wall element 66. An upper end of the upper partition wall section 70 is equipped with second fastening means 80, which allow coupling the partition wall module 66 to a near-ceiling region in the respective cabin.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An arrangement in a cabin of an aircraft, the arrangement comprising at least one passenger seat having a rearwardly extending leg and at least one partition wall module, wherein each partition wall module has a forward side and a rearward side, wherein each partition wall is directly arranged behind a backrest of a respective passenger seat, and wherein each partition wall module comprises:
a lower partition wall section having a first structure configured for fastening the partition wall module to a floor mounted component fixed to a floor in the cabin; and
a rigid upper partition wall section converging with the lower partition wall section, and having a second structure configured for fastening the partition wall module to a ceiling mounted component in the cabin;
wherein a portion of the upper partition wall section comprises an arched curvature around a horizontal axis located in front of the forward side of the respective partition wall module for adapting to the shape of the respective backrest of the respective passenger seat,
wherein the upper partition wall section is curved in a first direction,
wherein the lower partition wall section is curved in a second direction opposite of the first direction and extends forward of the rearwardly extending leg in a flight direction,
wherein the cabin comprises a door region between a monument and a passenger seat region, and
wherein a selected partition wall module is arranged directly at the door region opposite to the monument.

2. The arrangement according to claim 1, wherein the ceiling mounted component in the cabin is mounted to an over-head stowage bin.

3. The arrangement of claim 1, wherein the floor mounted component comprises holding points, which are integrated into the floor of the cabin.

4. The arrangement according to claim 1, wherein, for each partition wall module, the:
upper partition wall section terminates at opposite first and second lateral edges, at an upper edge interconnecting the first and second lateral edges, and at a lower edge interconnecting the first and second lateral edges;
first lateral edge contacts the lower edge at a first corner;
second lateral edge contacts the lower edge at a second corner;
partition wall module further comprises a rim that is continuous and that extends at least from the first corner to the second corner along the first lateral edge, the upper edge, and the second lateral edge of the upper partition wall section;
rim is stiffer than the upper partition wall section; and
lower partition wall section comprises first and second parallel elongate legs having a lower end forming the first structure configured for fastening the partition wall module to the floor mounted component, extending upward from the lower end to the lower edge of the upper partition wall section, and defining a gap configured to receive a seat leg of a seat frame of a passenger seat.

5. An aircraft comprising:
a passenger cabin formed with a cabin floor and a cabin ceiling;
a partition wall module for providing optical and mechanical separation of different cabin regions with the passenger cabin, the partition wall module having a forward side and a rearward side and comprising:
a lower partition wall section mounted to the cabin floor, wherein the lower partition wall section has a concave rearward-facing surface, the lower partition wall section extending in a vertical direction up to an upper delimitation of a seating surface of a passenger seat; and
an upper partition wall section mounted to the cabin ceiling and connected to the lower partition wall section, wherein a portion of the upper partition wall section has a concave forward-facing surface configured to receive a backrest of the passenger seat located forward of the partition wall module, wherein the upper partition wall section terminates at opposite first and second lateral edges and at an upper edge interconnecting the first and second lateral edges, wherein the partition wall module further comprises a rim that is continuous and that extends along the first lateral edge, the upper edge, and the second lateral edge of the upper partition wall section, and wherein the rim is stiffer than the upper partition wall section.

6. The aircraft according to claim 5, wherein the lower partition wall section comprises at least one elongate leg having a lower end configured for fastening the partition wall module to the floor mounted component, each elongate leg extending from the lower end to the upper partition wall section.

7. The aircraft according to claim 6, wherein the at least one elongate leg comprises two parallel elongate legs defining a gap for receiving a seat leg of a seat frame of a passenger seat.

8. The aircraft according to claim 5, further comprising a compartment that horizontally extends forward from the lower partition wall section, wherein the lower partition wall section defines an opening to the compartment.

9. The aircraft of claim 5, wherein the upper partition wall section terminates at a lower edge interconnecting the first and second lateral edges, wherein the first lateral edge contacts the lower edge at a first corner, wherein the second lateral edge contacts the lower edge at a second corner, and wherein the rim extends from the first corner to the second corner along the first lateral edge, the upper edge, and the second lateral edge of the upper partition wall section.

10. The aircraft of claim 5, wherein the partition wall module is realized as one piece and the lower partition wall section constitutes an integral part of the partition wall module and contacts the upper partition wall section at an interface.

11. The aircraft according to claim 5, wherein the partition wall module comprises an S-shape.

12. The aircraft according to claim 5, wherein an upper end of the upper partition wall section extends forward over the backrest and the seating surface in a flight direction.

* * * * *